US012780621B2

(12) United States Patent
Deimer

(10) Patent No.: US 12,780,621 B2
(45) Date of Patent: Nov. 3, 2026

(54) METHOD FOR OPEN-LOOP AND/OR CLOSED-LOOP CONTROL OF A VEHICLE-MOUNTED LIFTING GEAR

(71) Applicant: Palfinger AG, Bergheim bei Salzburg (AT)

(72) Inventor: Thomas Deimer, Moosdorf (AT)

(73) Assignee: PALFINGER AG, Bergheim bei Salzburg (AT)

( * ) Notice: Subject to any disclaimer, the term of this patent is extended or adjusted under 35 U.S.C. 154(b) by 327 days.

(21) Appl. No.: 18/503,705

(22) Filed: Nov. 7, 2023

(65) Prior Publication Data

US 2024/0076170 A1 Mar. 7, 2024

Related U.S. Application Data

(63) Continuation of application No. PCT/AT2022/060102, filed on Apr. 4, 2022.

(30) Foreign Application Priority Data

May 14, 2021 (AT) .............................. A 50105/2021

(51) Int. Cl.
*B66C 13/46* (2006.01)
*B66C 23/42* (2006.01)
*B66C 23/90* (2006.01)

(52) U.S. Cl.
CPC ............ *B66C 23/905* (2013.01); *B66C 13/46* (2013.01); *B66C 23/42* (2013.01)

(58) Field of Classification Search
CPC ....... B66C 23/905; B66C 13/46; B66C 23/42; B66C 13/20; B66C 13/48; B66C 23/701;
(Continued)

(56) References Cited

U.S. PATENT DOCUMENTS 5,711,440 A * 1/1998 Wada .................... B66C 23/905 212/277
10,138,094 B2 11/2018 Eberharter et al.
(Continued)

FOREIGN PATENT DOCUMENTS

CN 103303802 9/2013
CN 108369406 8/2018
(Continued)

OTHER PUBLICATIONS

International Search Report issued Jul. 18, 2022 in International (PCT) Application No. PCT/AT2022/060102.

*Primary Examiner* — Garcia Ade
(74) *Attorney, Agent, or Firm* — Wenderoth, Lind & Ponack, L.L.P.

(57) ABSTRACT

A method for open-loop and/or closed-loop control of a vehicle-mounted lifting gear, which lifting gear comprises an articulated crane arm system having a crane and a crane base, includes taking into account a determined position of at least one point of the crane arm system. A deformation of the crane arm system arising under the action of dynamic and/or static forces is taken into account when determining the position of the at least one point. An oblique position of the lifting gear resulting from an inclination of the crane base relative to a predetermined or predeterminable direction in space is determined and taken into account when determining the position of the at least one point.

25 Claims, 5 Drawing Sheets

(58) Field of Classification Search
CPC . B66C 23/36; B66C 23/44; B66C 2700/0357; A21C 15/04; A47J 47/12; B26B 29/063; B26B 2029/066; B26D 7/01; B26D 7/26; B26D 11/00; B26D 2210/02; B26D 2210/06
See application file for complete search history.

(56) References Cited

U.S. PATENT DOCUMENTS

| | | | | |
|---|---|---|---|---|
| 10,494,234 | B2 | 12/2019 | Wimmer et al. | |
| 11,692,821 | B2 | 7/2023 | Ruppel et al. | |
| 2013/0233820 | A1* | 9/2013 | Eberharter | B66C 13/18 702/150 |
| 2014/0297136 | A1 | 10/2014 | Miyoshi | |
| 2018/0105402 | A1 | 4/2018 | Wimmer et al. | |
| 2018/0354130 | A1 | 12/2018 | Preisinger et al. | |
| 2019/0084808 | A1* | 3/2019 | Hartmann | B66C 15/045 |
| 2019/0112165 | A1 | 4/2019 | Palberg et al. | |
| 2019/0233258 | A1* | 8/2019 | Reischauer | G01G 19/14 |
| 2019/0308851 | A1 | 10/2019 | Gustafsson et al. | |
| 2020/0148510 | A1 | 5/2020 | Rauscher et al. | |
| 2020/0191566 | A1* | 6/2020 | Ruppel | B66C 23/905 |
| 2021/0122615 | A1* | 4/2021 | Rauscher | B66C 13/063 |
| 2021/0179396 | A1* | 6/2021 | Schoonmaker | B66C 23/905 |
| 2022/0315395 | A1* | 10/2022 | Orfey | B66C 23/36 |

FOREIGN PATENT DOCUMENTS

| | | | |
|---|---|---|---|
| CN | 105631144 | | 1/2019 |
| CN | 109153548 | | 1/2019 |
| CN | 109641730 | | 4/2019 |
| CN | 111295354 | | 6/2020 |
| CN | 111964629 | | 11/2020 |
| DE | 199 83 149 | | 12/2014 |
| DE | 10 2017 202 009 | | 9/2017 |
| EP | 2 636 634 | A1 | 9/2013 |
| EP | 2 636 634 | B1 | 7/2015 |
| EP | 3 447 443 | | 2/2019 |
| EP | 3 556 710 | | 10/2019 |
| EP | 3 313 771 | | 12/2021 |
| ES | 2 544 445 | | 8/2015 |
| JP | S64-8196 | | 1/1989 |
| JP | H04-101996 | | 4/1992 |
| JP | H07-125987 | | 5/1995 |
| JP | H08-119582 | | 5/1996 |
| JP | H09-202598 | | 8/1997 |
| JP | 2014-201384 | | 10/2014 |
| JP | 2018-020890 | | 2/2018 |
| JP | 2019-069850 | | 5/2019 |
| KR | 10-2015-0122521 | | 11/2015 |
| RU | 2 684 254 | | 4/2019 |
| WO | 2016/205851 | | 12/2016 |

* cited by examiner

METHOD FOR OPEN-LOOP AND/OR CLOSED-LOOP CONTROL OF A VEHICLE-MOUNTED LIFTING GEAR

BACKGROUND OF THE INVENTION

The invention relates to a method for open-loop and/or closed-loop control of a vehicle-mounted lifting gear, comprising an articulated crane arm system having a crane tip and a crane base, taking into account an ascertained position of at least one point of the crane arm system, in particular the crane tip. A deformation of the crane arm system arising under the action of dynamic and/or static forces is taken into account when determining the position of the at least one point. In addition, the invention relates to an open-loop and/or closed-loop control device for a vehicle-mounted lifting gear. The invention furthermore relates to a vehicle-mounted lifting gear having at least one such open-loop and/or closed-loop control device, as well as a computer program product for carrying out such a method.

Such a method is already known from the document EP 2 636 634 B1, wherein a crane arm system of a lifting gear is modeled using a bar model in order to be able to ascertain the deformation of the crane arm system. A position of a load lifting means over a load mass arranged on the load lifting means and determined by measurement is determined. A boom erection angle between a crane tower or crane column and a horizontal or an inclination of the entire lifting gear when installed on a ship can be taken into account when determining the position of the load lifting means.

A deformation of the crane arm system can be present, for example, in the form of a sag, torsion, twisting—which is in particular lateral and/or vertical in the position of use of the lifting gear—or a combination of these. Such a deformation generally also applies to the crane column and a vehicle on which the lifting gear is arranged. As a rule, a combination of different types of deformation occurs. The crane arm system can generally comprise, for example, a crane column, a telescopic push arm system and a main arm arranged between the telescopic push arm system and the crane column. The crane arm system can, for example, also comprise an articulated system, wherein a main arm of the articulated system arranged on the crane base can be identified as the crane column. However, the crane column generally represents the connection between the crane base and a main arm (the first crane arm) of the crane arm system (for example formed as a telescopic system or an articulated arm system). All structural components of the crane arm system can as a rule be subject to significant deformations.

An inclination of a deformed crane arm system, in turn, interacts with the deformation caused by the inclination. For example, a known inclination of the vehicle is inadequate for a precise determination of a position of a point of the crane arm system as the vehicle can deform to different degrees and dependent on position even in the case of supporting elements with a finite stiffness and varying supporting points over a longitudinal extent of the vehicle. In the state of the art, there is no meaningful reference for an actually present inclination of the crane arm system with respect to a horizontal (in the sense of a world coordinate system with absolute coordinates of the entire lifting gear) or a ground assumed to be flat.

The inclination of the vehicle is not clear and is not constant in relation to a longitudinal extent because of different force effects and/or deformations over the longitudinal extent. The crane column, as a connection element between the crane arm system and the crane base, is also generally subject to significant deformations. However, precise knowledge of an inclination as reference is indispensable in order to be able to model the deformation correctly to a high degree using an accurately determined inclination in order to be able to thereby determine the position of the point of the crane arm system. In addition, a disadvantage of the state of the art is that the load mass—which likewise effects a defined deformation in the case of known geometry including inclination of the lifting gear—must be determined for each measurement in order to be able to deduce the deformation of the crane arm system, wherein the load mass, in contrast to the mass of the lifting gear, can be variable during use of the lifting gear.

SUMMARY OF THE INVENTION

The objective technical problem of the present invention is therefore to specify a method for open-loop and/or closed-loop control of a vehicle-mounted lifting gear improved compared with the state of the art as well as an open-loop and/or closed-loop control device in which the disadvantages of the state of the art are at least partially remedied, and which in particular are characterized by a precise ascertainment of a position of at least one point of the crane arm system.

Therefore, according to the invention, a tilt of the lifting gear because of an inclination of the crane base relative to a predefined or predefinable direction in space is determined and taken into account when determining the position of the at least one point.

It is thereby made possible first for the crane base, as the substantially rigid structural component of the lifting gear on which the crane arm system is arranged via a crane column and which can be connected to a vehicle, to serve or be used for determining a reference plane for an inclination of the crane arm system with a high degree of accuracy. The vehicle and the crane arm system itself do not represent a sufficient reference plane for determining a deformation of the crane arm system. In the case of a known inclination of the crane base with respect to a direction in space—in particular a horizontal in relation to a ground assumed to be planar or to a world coordinate system (in the sense of coordinates in a predetermined or determinable reference direction)—the deformation of the crane arm system can be particularly favorably modeled taking into account the inclination of the crane arm system caused by the inclination of the crane base.

Generally, the crane column can be connected to the crane base in an articulated manner or rigidly, and/or the crane base can be directly connected to a vehicle frame of the vehicle. Data relating to inclination of the crane base and deformation of the crane arm system are acquired and taken into account for determining the point.

The term lifting gear includes, for example, mobile cranes, bridge inspection cranes, hooklifts, mobile elevating work platform cranes et cetera, wherein the terms crane arm system, crane base and further structural component terms with the prefix crane are to be interpreted broadly such that they also include such structural components, for example, in conjunction with lifting platforms. Articulated systems or telescopic systems, which can also occur in combination, are particularly preferred.

For a current deformation of the crane arm system, it is insignificant whether an alignment of the crane arm system tilted relative to a ground or a horizontal is caused by an inclination of the crane base or by a load mass or because of a present geometry of the crane arm system. Through the knowledge of the inclination of the crane base, deformation can be particularly favorably taken into account in the case of movements of the crane arm system using a deformation model and the causes can be differentiated.

The inclination of the crane base can be ascertained for example via an inclination sensor, wherein because of a stiffness of the crane base the inclination—at least when the crane arm system is at standstill and the load mass arranged on the crane arm system is unchanging—is substantially constant and clear with respect to a horizontal. The inclination is, among other things, dependent on present stroke lengths of push arms and on a load mass arranged on the crane arm system, wherein both stroke lengths and load mass influence the deformation of the crane arm, and in turn a reaction coupling to the deformation of the crane arm system is generated via the change in inclination accompanying it. Further factors in connection with a present inclination of the crane base can be for example a geometry of the lifting gear (such as present angles of the crane arm system), a supporting state of the lifting gear on a ground, a firmness of the ground, stiffnesses of supporting elements et cetera, wherein angles of push arms of the crane arm system in space are also dependent on the inclination of the crane base and on the deformation of the crane arm system and bring about a reaction coupling in relation to deformation of the crane arm system and inclination of the crane base.

The position of the at least one point is essential for various requirements for the lifting gear such as path accuracy, collision avoidance, performance and/or accuracy of convenience functions (in particular with increasing level of automation), currently present overload protections or currently present structural stability, wherein an angle of the individual push arms generally cannot be sufficiently deduced on the basis of deformation models of the crane arm system without taking into account the inclination of the crane base as a decisive reference. Accordingly, the crane tip can be ascertained with high accuracy according to the invention in absolute coordinates (world coordinate system). As the deformation of the crane arm system interacts with an angle of individual push arms which is dependent on the inclination of the crane base, an absolute localization of individual structural components of the crane arm system can be determined precisely.

A deformation model for the crane arm system and/or the lifting gear (possibly with an arranged vehicle) which models push arms, main arm, arm system linked to a telescopic push arm system and/or crane column (analogous consideration applies to an articulated system provided as a supplement or alternative) via an algorithm is particularly preferably used here. Individual structural components—in particular the push arms, the main arm and/or a crane column of a crane arm system, preferably articulated system—are modeled rigidly, elastically and/or via a bar model for determining the position of the at least one point. In this context, the technical term elastically means that for example a push arm under load is deformable flexibly taking into account the stiffness. The crane arm system can generally be formed, for example, in the form of a telescopic push arm system or as an articulated system.

Added to this is the positive property that the functionalities of the vehicle-mounted lifting gear for a user can be improved or provided more conveniently and/or flexibly. This relates, for example, to geometry-dependent functions such as steep position, crane position in space and/or compliance with restricted areas (for example height limits, opposite track locks or protection zones, in particular definable by an operator of the lifting gear, such as building facades), capacity utilization dependent functions such as overload, structural stability and/or weighing as well as semi-automatic functions or convenience functions such as coordinate control, storage of positions of the at least one point, path planning and/or collision protection. For example, in relation to the collision protection of the lifting gear, correction signals calculated by a crane controller of the lifting gear can be ascertained or an override of operator input for the lifting gear can be effected.

In this context, the crane controller is to be regarded as an open-loop and/or closed-loop control mechanism assigned to the lifting gear. The open-loop and/or closed-loop control device can, for example, represent a part of the crane controller (for example in the sense of a determination module) which is provided for carrying out the method for open-loop and/or closed-loop control. A link of the crane controller to the lifting gear and/or the open-loop and/or closed-loop control device can generally be present connected by wires and/or radio signals.

An absolute angle of a push arm—in particular the outermost (in relation to a distance from the crane column) push arm—in space can also be of particular interest in order for example to install a mechanical and/or hydraulic articulated system. For this, in the state of the art, a push arm angle is usually measured directly in a crane arm bearing or in the immediate vicinity thereof, as substantially no deformation occurs here. However, the angle of the push arm, in particular under deformation, therefore deviates markedly from the absolute angle in space, wherein even a correction angle, assuming a rigid crane arm system, does not lead to a correct absolute angle of the articulated system, as the angle measurement is effected relative to the outermost push arm. An angle determination, in particular of the outermost push arm, taking into account a deformation model as well as the inclination of the crane base is therefore particularly preferred. The angle determination can be effected exclusively by calculations of the deformation model and/or using sensor data such as for example from an angle sensor system.

In a model for determining the deformation, specific structural components such as crane column and/or main arm can be assumed to be rigid despite actual deformation, wherein deformations of these structural components can absolutely also be included in a deformation model depending on requirements for a precision of the calculation.

As stated at the beginning, protection is also sought for an open-loop and/or closed-loop control device for a vehicle-mounted lifting gear comprising an articulated crane arm system having a crane tip, wherein the open-loop and/or closed-loop control device can be supplied with at least one sensor signal from at least one sensor arranged on the lifting gear. The open-loop and/or closed-loop control device is configured in at least one operating mode to ascertain a deformation of the crane arm system arising under the action of dynamic and/or static forces taking into account the at least one sensor signal and to determine a position of at least one point of the crane arm system, in particular the crane tip, taking into account the deformation. The open-loop and/or closed-loop control device is or can be connected to an inclination sensor in a signal-carrying manner, and is configured in the at least one operating mode to determine a tilt of the lifting gear because of an inclination of the crane base on which the lifting gear is arranged relative to a predefined or predefinable direction in space taking into account inclination sensor signals from the inclination sensor and to take it into account when determining the position of the at least one point.

For example, an inclination sensor for capturing the inclination of the crane base can be arranged on a rigid component such as the crane base, in order to deduce the current angles between push arms, between a push arm and a crane column and/or between the crane column and the crane base via a deformation model (among other things based on data from the at least one sensor), wherein correction values are in particular calculated for the angles.

It is also conceivable to carry out the measurement of the inclination indirectly. The inclination sensor is for example arranged on an outer push arm and the inclination of the crane base is deduced using the deformation model via a measured inclination of a push arm (relative to the crane base, the crane column and/or a further push arm).

The number of sensors and inclination sensors is generally as desired, wherein an accuracy of the inclination measurement of the crane base can be increased by a plurality of sensors and/or inclination sensors. The number of the sensors and/or inclination sensors is particularly preferably equal to the number of telescopic push arms of the vehicle-mounted lifting gear reduced by 1 and not smaller than 1.

A tilt of the crane arm system can be caused by a deliberate tilt via a geometry of the crane arm system, by an inclination of the crane base and by a deformation of the crane arm system, wherein all three aspects can be taken into account in the determination of the position of the at least one point and in particular in a model for determining the deformation of the crane arm system.

As stated at the beginning, protection is also sought for a vehicle-mounted lifting gear having at least one such open-loop and/or closed-loop control device, an articulated crane arm system having a crane tip, a crane base, at least one sensor arranged on the lifting gear and an inclination sensor.

As stated at the beginning, protection is also sought for a computer program product comprising commands which, when executed by such an open-loop and/or closed-loop control device, prompt the latter to carry out the steps of such a method.

According to an advantageous design of the invention, the crane arm system comprises at least one telescopic push arm system having at least two push arms. A current stroke length of at least one of the at least two push arms is determined and taken into account when determining the position of the at least one point, preferably via a stroke length sensor system, wherein the current stroke length is taken into account in a model for determining the deformation of the crane arm system.

The push arms can generally be formed articulated (via an articulated system) and/or translationally movable, wherein a geometry of the crane arm system is altered by a change in the stroke length, whereby the deformation of the crane arm system and the inclination of the crane base can change. A load mass possibly arranged on the crane arm system and/or a change in an angle of a push arm and/or of an articulated system also causes, in particular in the case of different stroke lengths, varying moments.

Advantageously, the at least two push arms have different stiffnesses from each other, and the stiffnesses are calculated and/or taken into account for determining the position of the at least one point. However, different stiffnesses are generally not imperative—for example a thinner and larger cross section of a push arm can have the same stiffness as a thicker and smaller cross section of a push arm, wherein in the deformation model, for example, a plurality of push arms can be summarized via a stiffness assigned to the plurality of push arms (e.g. of the entire telescopic push arm system).

The ascertainment of the position of the at least one point can be effected particularly accurately by taking into account different stiffnesses and their influences on the deformation of the crane arm system (for example telescopic push arm system and/or articulated system). The stiffnesses generally depend on material-specific and geometric parameters.

It has proved to be favorable that the stiffnesses, an influence of the stiffnesses on the deformation of the crane arm system and/or the deformation of the crane arm system are ascertained via the inclination of the crane base and/or the tilt of the lifting gear and/or the stroke length of the at least two push arms.

The different stiffnesses can represent an output parameter of the ascertainment of the position of the at least one point on the basis of a model for the deformation of the crane arm system—for example if the stiffnesses of the push arms are not accurately known. If for example the deformation of the crane arm system and the inclination of the crane base (possibly ascertained by sensors) are known, a conclusion can be drawn as to the present stiffnesses, in particular in the case of present wear of the crane arm system after a given service life of the lifting gear. The stiffnesses, preferably different stiffnesses, of the crane arm system particularly preferably represent an input parameter of the deformation model for ascertaining the position of the at least one point.

Parameters in relation to a geometry of the lifting gear can generally represent influencing variables for the model for calculating the deformation or, looked at the other way, an output variable from the deformation model. As a rule, the stiffnesses or their influences on the deformation of the crane arm system form parameters for calculating the deformation of the crane arm system; conclusions can generally also be ascertained as to the stiffnesses or their influence on the deformation of the crane arm system on the basis of a deformation model taking into account stroke lengths and/or inclination of the crane base and/or tilt of the lifting gear.

According to a preferred design of the invention, the crane arm system comprises at least two telescopic push arms, wherein the at least two push arms have a sequence control. A currently present stroke length of the at least one push arm is taken into account when determining the position of the at least one point.

The sequence control can be used in order particularly favorably to be able to produce a clear relationship between stroke lengths of push arms and stiffnesses of the individual push arms in the case of a given profile shape and/or cross-sectional area, and the individual push arms of the crane arm system can be provided with different stiffnesses. Analogous consideration applies to the calculation of the center of gravity and the intrinsic moment. The sequence control can, in connection with the knowledge about the positioning of the individual push arms, serve for the application of the deformation model used, wherein for example it can be determined particularly precisely whether the position of the at least one point of the crane arm system is located above or below a horizontal through the inclination of the crane arm system in space (caused by the inclination of the crane base and the forces acting on the crane arm system). The sequence control is particularly preferably used if individual push arms have different stiffnesses.

Alternatively, according to a preferred embodiment of the invention, the crane arm system comprises at least two telescopic push arms and comprises a partial sequence control (a sequence control which only relates to individual push arms of the crane arm system) or is formed without sequence control (wherein no sequence control is provided. In addition:

an additional sensor system is provided for ascertaining stroke lengths of the at least two push arms, and/or stiffnesses of push arms that are not sequence-controlled are combined into a common stiffness, wherein a shift of the center of gravity of the lifting gear is preferably taken into account, and/or a calculation of the deformation of the crane arm system is carried out via a model for determining the deformation of the crane arm system with a first stiffness and with a second stiffness different compared with the first stiffness.

In particular if, for space and/or cost reasons, only a partial sequence control or no sequence control at all is possible, conclusions can thereby be drawn indirectly as to the stroke lengths and/or a relationship to the stiffnesses for the determination of the position of the at least one point. The choice and number of push arms that are not sequence-controlled is generally as desired. If calculations are carried out with different, preferably predefined or predefinable, stiffnesses, the calculation which causes the least favorable case (worst-case scenario) as the result of the calculation can be used, depending on an area of application and/or requirements for the lifting gear, in order, for example using a point on the crane arm system furthest removed by the calculation, to be able to ascertain a reliable overload protection and/or height limit or to be able to take into account any margins of error in the calculation of the position of the at least one point. The first stiffness and the second stiffness can generally be assumed on the basis of a geometry of push arms, preferably individually for individual push arms. It is also conceivable to use the more favorable case and calculations with a plurality of stiffnesses.

A partial sequence control is particularly preferably provided in the case of at least three telescopic push arms. For example, at least two of the at least three telescopic push arms are provided with a (partial) sequence control. In this context, partial sequence control means that not all existing push arms of the crane arm system are extended or retracted in succession, but rather only a portion of the total number of push arms are. A sequence of the push arms can be effected arbitrarily (individually and/or definably) for those push arms which are not sequence-controlled.

According to an advantageous embodiment of the invention, the lifting gear comprises at least one rigid lifting gear section, preferably the crane base, a vehicle for the lifting gear and/or a crane column, and at least one deformable lifting gear section, preferably at least one possibly existing push arm of the crane arm system, wherein the inclination of the lifting gear on the at least one rigid lifting gear section is determined and/or is taken into account in a model for determining the deformation of the crane arm system.

A model for determining the deformation of the crane arm system and subsequently for determining the position of the at least one point can be adapted depending on requirements for accuracy and/or type of the lifting gear. A model for determining the deformation of the entire vehicle-mounted lifting gear, preferably with a vehicle arranged on the vehicle-mounted lifting gear, can generally also be provided. The choice of the rigid and deformable lifting gear sections is generally as desired, wherein all structural components of the lifting gear can also be assumed to be deformable. Forms of lifting gear with telescopic crane column or articulated arm instead of a main arm are likewise conceivable and can be taken into account flexibly in the deformation model. The crane column is preferably the connection element between crane base and main arm (for example a first telescopic push arm or a first articulated arm linked to the crane column).

It has proved to be advantageous that, preferably via at least one inclination sensor and/or at least one angle sensor system, the inclination of the crane base relative to a ground, and/or at least one angle between a rigid lifting gear section and a further rigid lifting gear section, and/or at least one angle between a rigid lifting gear section and a deformable lifting gear section, and/or at least one angle between a deformable lifting gear section and a further deformable lifting gear section, is ascertained, wherein the inclination of the crane base, the tilt of the lifting gear and/or the at least one angle is taken into account in a model for determining the deformation of the crane arm system, wherein the position of the at least one point is calculated.

In addition to the determination of the at least one point on the crane arm system, an angle of at least one push arm in space is particularly preferably also determined. The angle of the at least one push arm is preferably ascertained by an angle sensor system via a further angle between a rigid lifting gear section and a rigid lifting gear section, wherein the further angle is taken into account in a deformation model taking into account the inclination of the crane base.

In this context, a rigid lifting gear section does not define a stationary structural component, but rather a structural component which, although it is movable for example in an articulated manner relative to a further structural component of the lifting gear, in the deformation model is assumed to have an increased stiffness and/or to be substantially inflexible.

Through the determination of at least one angle, conclusions can be drawn as to a geometry—possibly taking into account stroke lengths of push arms—which has an influence on the inclination of the crane base and the deformation of the crane arm system. A model for the deformation of the crane arm system can comprise, as input parameters, for example the inclination of the crane base and the angles determined by an angle sensor system in order to model the deformation of the crane arm system.

For example, the inclination of the crane base and an angle relative to the crane column can be measured, wherein the angles of push arms are calculated using the model for determining the deformation considering the inclination and/or the angle relative to the crane column. However, the angle can also be measured on a push arm or on a plurality of structural elements of the crane arm system.

It is also conceivable that stiffnesses of the push arms and/or of the crane column are determined using the information of the inclination of the crane base and the ascertained angle.

In particular, lateral deformations of the lifting gear and angles of the individual push arms of the crane arm system—relative to each other and/or absolute in space—can be ascertained taking into account the inclination of the crane base.

An advantageous variant of the present invention is that a plurality of points of the crane arm system is calculated, wherein a geometry of the crane arm system, preferably of the lifting gear, is ascertained via the plurality of the points.

If a plurality of points of the crane arm system is known, for example a collision avoidance of the crane tip can be expanded to further structural components of the lifting gear. However, a collision avoidance is generally not restricted to the crane tip and can among other things be related to the vehicle and/or structural components of the crane arm system—for example with a sensor system for environment recognition.

It is particularly preferred that a load mass arranged on the lifting gear is calculated taking into account the deformation of the crane arm system and the inclination of the crane base. Preferably, the load mass is calculated before, during, and/or after the determination of the position of the at least one point, particularly preferably via a possibly existing angle sensor system and/or a pressure sensor system.

The load mass thereby need not be ascertained via a sensor, wherein for example the load mass is calculated and the deformation model is adapted via the calculated load mass, in particular taking into account the present angles, stroke lengths and/or stiffnesses of the push arms. The load mass can be calculated, for example, on the basis of a changed geometry of the crane arm, the deformation of the crane arm system and/or a changed inclination of the crane base relative to a horizontal. The load mass can be defined for example by a bearing load arranged on a crane hook.

By way of example, the load mass can be determined as follows:

- sensors in the form of angle sensor systems ascertain an angle between push arms, crane column and crane base, wherein the stroke lengths of the push arms are ascertained via the angles in the case of a given total stroke length or possibly via a stroke length sensor system,
- a capacity utilization of the lifting gear is ascertained and/or calculated by a pressure measuring sensor in load-determining cylinders of the push arms,
- the deformation of the crane arm system is calculated via the capacity utilization, and
- the load mass is calculated using the deformation and the capacity utilization.

Analogously, the load mass can also be ascertained in the case of a lifting gear which has an articulated system as a supplement and/or alternative instead of push arms, wherein the angles are accordingly determined relative to the arms (such as main arm and/or further arms connected in an articulated manner) of the articulated system.

The position of the at least one point can be ascertained considering the inclination of the at least one crane base and the deformation of the crane arm system.

It is generally also conceivable that at least two deformation models are used for the determination of the position of the at least one point or an actually present deformation is compared with the deformation from the deformation model. The deformation from the deformation model can possibly be adapted using the actually present deformation. The deformation model can be approximated, for example, using a bar model.

In a preferred embodiment of the invention, a load mass, preferably the calculated load mass, is taken into account in a model for determining the deformation of the crane arm system.

The inclination of the crane base and the deformation of the crane arm system are, among other things, dependent on the load mass arranged on the crane arm system. On the one hand, the load mass can be ascertained from inclinations of the crane base and deformations of the crane arm system, and on the other hand the load mass can be included in the deformation model of the crane arm system (taking into account the inclination), whereby a particularly advantageous determination of the position of the at least one point can be guaranteed.

On the one hand, the load mass can be determined first in an iterative process via the deformation model and then the load mass can be used for the calculations according to the deformation model. On the other hand, the deformation model can be influenced by the reaction coupling of the load mass to the deformation or adapted such that the deformation model guarantees conclusions as to the actually present deformation of the crane arm system with particularly high precision. The load mass can generally also be used for the purposes of calibrating the model for determining the deformation of the crane arm system.

According to a preferred embodiment of the invention, a model for determining the deformation of the crane arm system is calibrated using a predefinable or predefined wear of the crane arm system and/or at least one predefinable or predefined parameter.

The at least one predefinable or predefined parameter can, for example, represent a currently present stroke length of a push arm, a speed of a movement, a profile shape and/or cross-sectional area. It is also conceivable to set a desired overload protection and/or structural stability as parameters for the calibration or as a limit value for a maximum deformation of the crane arm system. The parameter particularly preferably represents the load mass which can particularly favorably serve for a correct calibration within short time periods. As a rule, wear represents a long-term effect, wherein the wear can preferably be used to increase an accuracy in the determination of the position of the at least one point by effecting a (post) calibration for example in the case of reduced performance of the lifting gear and/or of the deformation model considering the wear. A first calibration is preferably effected in order for example to compensate for the influence of certain tolerances (of components, in manufacture et cetera), which are particularly preferably taken into account in the model for determining the deformation of the crane arm system.

According to a preferred design of the invention, at least one control signal is manually predefined for the lifting gear and at least one control variable is calculated for at least one actuator taking into account the position of the at least one point and/or a predicted position of at least one point.

The knowledge of the inclination of the crane base and the position of the at least one point makes an extrapolation possible with respect to movements of the crane arm system, whereby a path accuracy can in particular be increased. The predicted position can be ascertained using the same deformation model, wherein the crane arm geometry to change in the future serves as a parameter for the calculation. Through the knowledge of the current position and the predicted position, semi-automatic functions such as a coordinate control (in particular in the case of two articulated systems on the lifting gear) can be improved, wherein an actuator control or an operating sequence can also be preferentially influenced.

In this connection, it can also be made possible to repeatedly cover a stored path of the crane arm system, in particular under different capacity utilizations or varying load masses.

Semi-automatic functions in the sense of convenience functions can relate for example to the positioning of the crane arm system in space (possibly taking into account a path accuracy and/or collision avoidance), wherein for example a desired unloading point is predefined and the required positions for the calculation are transmitted to the lifting gear via a crane controller of the lifting gear, in order to be able to deposit a load mass at the unloading point.

If the crane arm system comprises an articulated system and a further articulated system, it is particularly preferred to determine an angle between the two articulated systems (absolute in space relative to a reference plane) taking into account the inclination of the crane base and the deformation of the crane arm system (cf. FIG. 5).

Furthermore, preferably a deformation and/or inclination of a vehicle on which the lifting gear is arranged with respect to a ground is ascertained and/or calculated and is taken into account when determining the position of the at least one point.

The inclination of the vehicle and/or the crane column generally need not be determined according to the invention, but can additionally reduce an error proneness of the position of the at least one point. The inclination of the crane base generally comprises the inclination of the vehicle, wherein the inclination of the vehicle can also adopt values which are different depending on position because of twisting.

In a further embodiment, the position of the at least one point with the associated inclination of the crane base and/or the associated deformation of the crane arm system, preferably with possibly existing stroke lengths of push arms and/or angles between push arms and the crane base, are stored in a database.

The storage in the database can make it possible for a user to conveniently actuate an already implemented position of the at least one point again, wherein a movement of the lifting gear is possibly corrected using a changed load mass (with effect on the inclination and the deformation) or changed geometries of the crane arm system.

According to an advantageous design of the invention, a trajectory planning of the position of the at least one point and/or of the lifting gear taking into account the inclination of the crane base and the deformation of the crane arm system is created along a planned trajectory through the determination of the position of the at least one point.

According to a preferred embodiment of the invention, the trajectory planning is created on the basis of the positions of the at least one point stored in the database.

The trajectory planning can generally be generated both on the basis of a model for the deformation of the crane arm system—possibly taking into account a changed inclination of the crane base—and using already determined positions of the at least one point, wherein parameters such as a geometry of the crane arm system can in particular be taken into account.

It is particularly preferable that the position of the at least one point is made available to at least one semi-automatic function of a crane controller. Preferably, a trajectory planning of the lifting gear is ascertained taking into account the position of the at least one point and/or can be corrected by manual input.

It is also conceivable that manual input is corrected using the trajectory planning and/or the position or a predicted position of the at least one point via a crane controller.

Particularly preferably, at least one capturing sensor system, preferably a camera, for capturing objects and/or obstacles within a reach of the lifting gear is provided. The objects and/or obstacles are taken into account in the trajectory planning. As an alternative or supplement, a radar, lidar, ladar, laser, ultrasonic sensor or the like can be used as at least one capturing sensor system.

Using the at least one capturing sensor system, a path planning can be calculated taking into account evasion routes and/or objects or obstacles to be avoided in the sense of a collision avoidance. For example, a camera captures objects and creates an evasion route on the basis of the position of the at least one point and/or predicted positions of the at least one point. It is also conceivable to actuate a robotic crane by transmitting the current crane tip position via an external controller.

According to a preferred embodiment of the invention, a position of the center of gravity of the crane arm system is taken into account in the determination of the position of the at least one point depending on the inclination of the crane base, the deformation of the crane arm system, a geometry of the crane arm system and/or a weight of hydraulic oil arranged in at least one push arm of the crane arm system. A load mass possibly arranged on the lifting gear is preferably calculated via the inclination of the crane base, the deformation of the crane arm system, the geometry of the crane arm system, and/or the weight of hydraulic oil arranged in the at least one push arm of the crane arm system.

The position of the center of gravity is dependent, in particular, on the inclination of the crane base, a geometry of the crane arm system and present stroke lengths of push arms. Moreover, the position of the center of gravity is influenced by an amount of hydraulic oil volume (in the case of a given temperature and/or density) and its location in the push arms.

For example, a change in the center of gravity of the respective push system can be taken into account and/or calculated in the model for the deformation such as sag in particular of telescopic push systems, whereby a currently present load mass can be particularly preferentially ascertained without having to determine the load mass in advance—e.g. via a sensor provided for it—wherein the ascertainment can be dependent on the current crane position and/or crane geometry caused by a change in the quantity of hydraulic oil in the hydraulic cylinder, wherein the quantity of hydraulic oil can in turn be dependent on the cylinder position and/or a ratio of piston and rod surface area.

The position of the center of gravity has an influence on the intrinsic moments of the vehicle-mounted lifting gear, which can in turn be used for specifically present overload and/or structural stability of the crane via a deformation model. For example, a capacity utilization can serve as an input variable for a deformation model, wherein in particular a pressure in the lifting cylinder is measured via pressure sensors and the capacity utilization is determined via the crane geometry and a cylinder force is preferably corrected by a cylinder friction determined via a friction model. The load mass determined can be taken into account in the deformation model.

The quantity of hydraulic oil is preferably taken into account for at least one push arm and/or at least one articulated arm cylinder of a first articulated system of the crane arm system. In an embodiment of the lifting gear with two articulated systems, the quantity of hydraulic oil is taken into account for at least one push arm and/or at least one articulated arm cylinder of the second articulated system. The intrinsic moments in the case of present geometry of the lifting gear can thereby particularly preferably be included in the deformation model.

It has proved to be favorable that a shift of the position of the center of gravity brings about a change in a structural stability and/or an overload protection.

In this context, the structural stability relates to the maximum moment at which the lifting gear does not tip considering a defined safety margin. In this context, the overload protection relates to the maximum moment at which a plastic deformation of the lifting gear does not yet occur with regard to a defined safety margin.

The shift of the position of the center of gravity can be identified via a sensor system and/or be calculated from a model for determining the deformation of the crane arm system, wherein the structural stability and overload protection can be calculated more accurately and/or be exploited better.

A position of the center of gravity can be influenced both by the lifting gear operation of the lifting gear and by its setup condition. For example, a weight of the crane substantially always remains constant in a cable winch operation, wherein, however, the position of the center of gravity generally changes from the setup condition—for example in the case of different conditions of a cable such as number of cable strands, degree of unwinding of a cable drum, position of the cable et cetera—depending on a weight distribution of the cable on the lifting gear.

A lateral deformation of the crane arm system and/or an inclination of the individual push arms are particularly preferably taken into account when ascertaining the position of the at least one point and/or when determining an inclination of a push arm.

A crane controller iteratively ascertains a crane position according to a rigid and not inclined model via a geometry sensor system, ascertains a crane position according to a rigid and inclined model via an inclination measurement sensor system and ascertains a crane position deformed and inclined via a pressure measuring sensor system in load-determining lifting cylinders. The load mass or bearing load is determined through a determination of the load and intrinsic moments. The crane controller can generally also carry out the process steps simultaneously and/or for example dispense with the ascertainment of the load mass.

If a user of the vehicle-mounted lifting gear predefines control signals, control variables can be calculated by the crane controller and, for example, adapted for safety-directed functions and/or convenience functions, and a set of control variables can be generated for the associated actuators.

An angle of selected structural components of the lifting gear can also be determined via at least two positions of two points.

The features of the method can be transferred to the device and vice versa.

BRIEF DESCRIPTION OF THE DRAWINGS

Further details and advantages of the present invention are explained in more detail below with the aid of the description of the figures with reference to the embodiments represented in the drawings, in which.

DETAILED DESCRIPTION OF THE INVENTION

Figure 1:
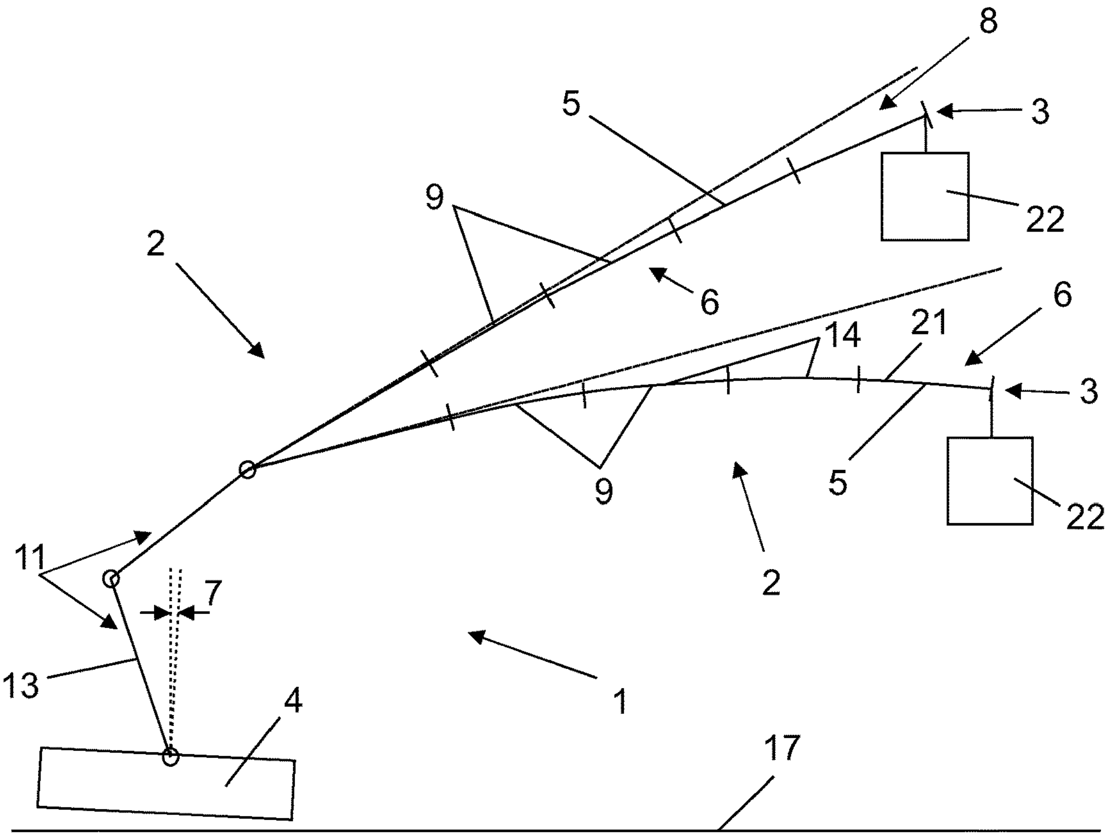
FIG. 1 shows a lifting gear having an inclined crane base and a load mass arranged on a crane arm system in two different geometries of the crane arm system in a schematic representation.
Figure 6:
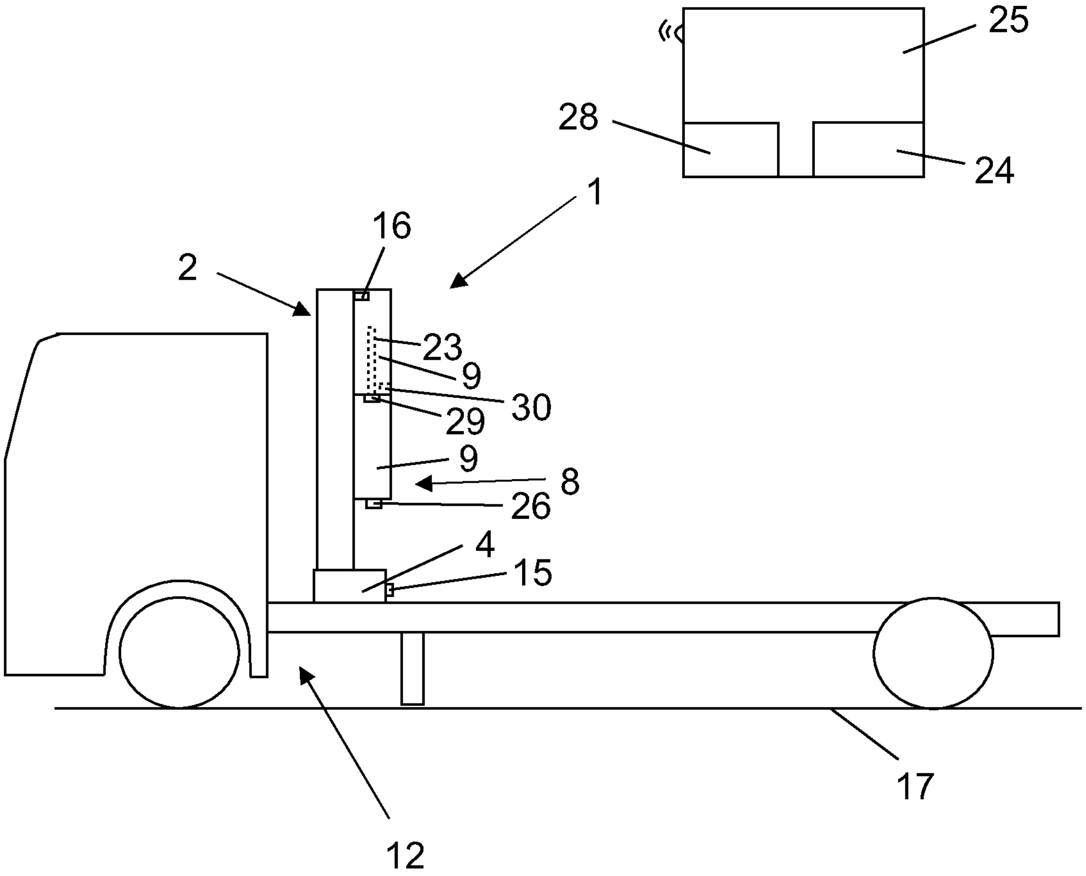
FIG. 6 shows a vehicle-mounted lifting gear having a crane arm system and a crane controller in a schematic representation.

FIG. 1 shows a vehicle-mounted lifting gear 1, wherein the vehicle is not shown in the representation for reasons of clarity (cf. FIG. 6). The lifting gear 1 comprises an articulated crane arm system 2 having a crane tip 3 and a crane base 4, wherein the lifting gear 1 is formed to be controlled taking into account an ascertained position of a plurality of points 5 (the singular is used in the following embodiments) of the crane arm system 2 and in particular the crane tip 3, wherein a deformation 6 of the crane arm system 2 arising under the action of dynamic and static forces is taken into account when determining the position of the point 5. The plurality of points 5 of the crane arm system 2 is calculated via a deformation model, wherein a geometry of the lifting gear 1 is ascertained via the plurality of the points 5.

The lifting gear 1 is represented in two positions, wherein different deformations 6 are caused by intrinsic moments and a load mass 22 depending on a geometry of the crane arm system 2. The load mass 22 can be calculated from the deformations 6 and need not be ascertained separately via a sensor system. The associated undeformed geometries of the crane arm system 2 are indicated dashed.

A tilt of the lifting gear 1 because of an inclination 7 of the crane base 4 relative to a predefined direction in space is determined and taken into account when determining the position of the point 5. The predefined direction in space represents a reference direction which can be defined in absolute coordinates (world coordinates to be freely defined) and can represent a basis for the geometry of the crane arm system 2 relative to a horizontal.

A load mass 22 arranged on the crane arm system 2 of the lifting gear 1 is calculated taking into account the deformation 6 of the crane arm system 2 and the inclination 7 of the crane base 4, wherein the load mass 22 can be calculated before, during and after the determination of the position of the point 5. An angle sensor system or a pressure sensor system 30 (cf. FIG. 6) can be used in a supporting manner.

The calculated load mass 22 is taken into account in a model for determining the deformation 6 of the crane arm system 2.

Figure 2:
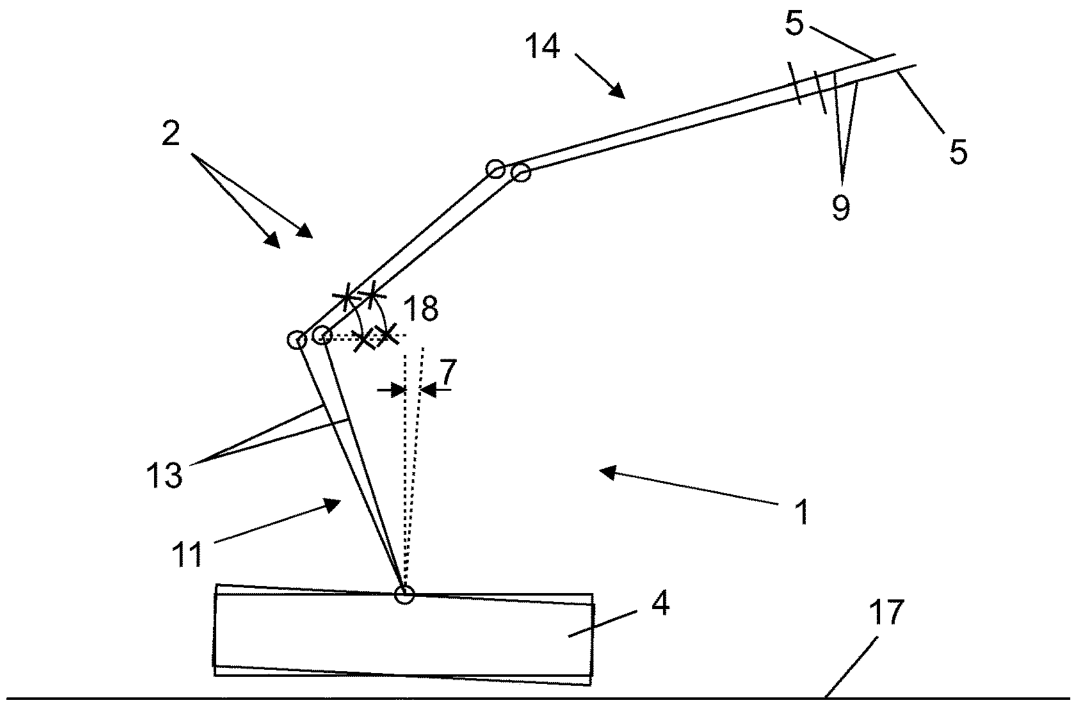
FIG. 2 shows a lifting gear having an inclined and a not inclined crane base in a schematic representation.

FIG. 2 shows the lifting gear 1 having a rigid lifting gear section as crane column 13 and crane base 4 and a deformable lifting gear section 14 in the form of push arms 9. An articulated arm, adjoining the telescopic push arms 9, of the articulated system represents a lifting gear section 11 assumed to be rigid. The choice of rigid structural elements for the model for determining the deformation of the crane arm system 2 is generally as desired and not imperative, wherein all sections of the lifting gear 1 are particularly preferably assumed to be deformable. An inclination sensor 15 is particularly preferably arranged on the crane base or on a section with low deformability compared with push arms 9, but an indirect determination of the inclination 7 of the crane base 4 via the deformation model is generally also conceivable.

Rigid means here that they can also be assumed or are also assumed to be rigid in the deformation model. A bar model, wherein for example the crane column 13 which is more rigid relative to the push arms 9 is also assumed to be deformable, is particularly preferred, wherein the inclination 7 of the lifting gear 1 can still be determined on the crane column 13 (or the crane base 4), even if this can likewise be subject to not inconsiderable deformations. A direct measurement of the inclination 7 on the crane base has proved to be particularly favorable.

The lifting gear 1 is represented in the case of an inclined and uninclined crane base 4, wherein an angle 18 between an arm of the articulated system adjoining the crane column 13 is identical; the geometry of the lifting gear 1 is, however, formed differently because of the inclination 7. The inclination 7 can be compensated for via correction angles taking into account the accompanying deformation of the crane arm system 2, in order to maneuver a point such as the crane tip 3 automatically to the desired location.

Figure 3A:
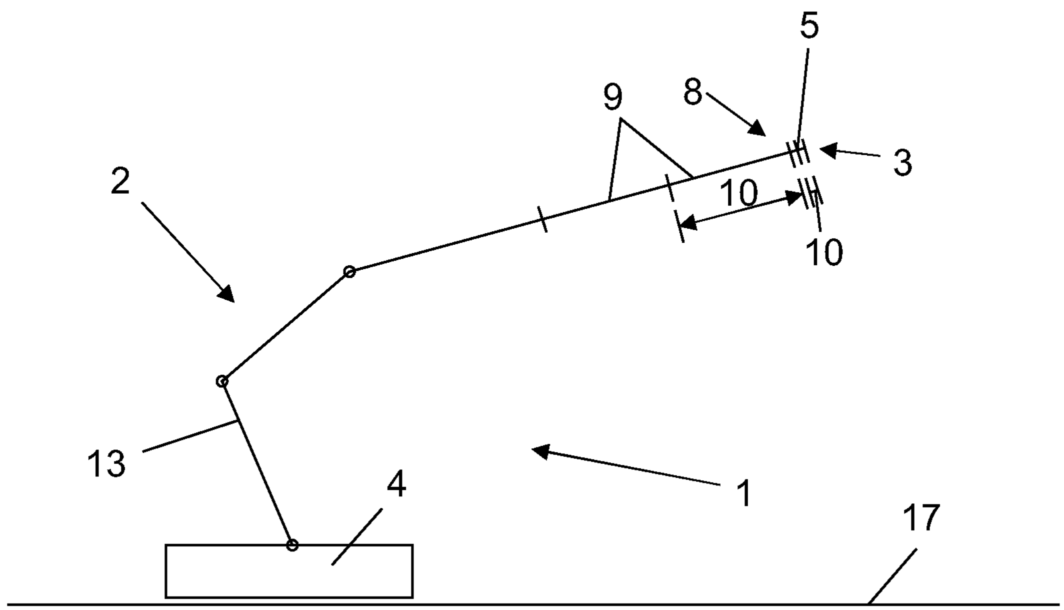
FIGS. 3*a*-3*b* shows a lifting gear with sequence control and a lifting gear without sequence control in a schematic representation.

FIG. 3*a* shows a crane arm system 2 having a sequence control, wherein the push arms 9 have different stiffnesses, wherein the stiffnesses, an influence of the stiffnesses on the deformation 6 of the crane arm system 2 and the deformation 6 of the crane arm system are ascertained and taken into account among other things for determining the position of the at least one point 5. The influence of the stiffnesses on the deformation 6 is then integrated in the deformation model, wherein the stiffnesses can generally also be already known. Currently present stroke lengths 10 of the telescopic push arms 9 of the crane arm system 2 are taken into account in the determination of the position of the point 5.

The stiffnesses and their influence on the deformation 6 of the push arms 9 of the crane arm system 6 can be calculated in the case of an inclined lifting gear 1 possibly via the inclination 7 of the crane base 4, the tilt of the lifting gear 1 or the stroke length of the push arms 9.

Figure 3B:
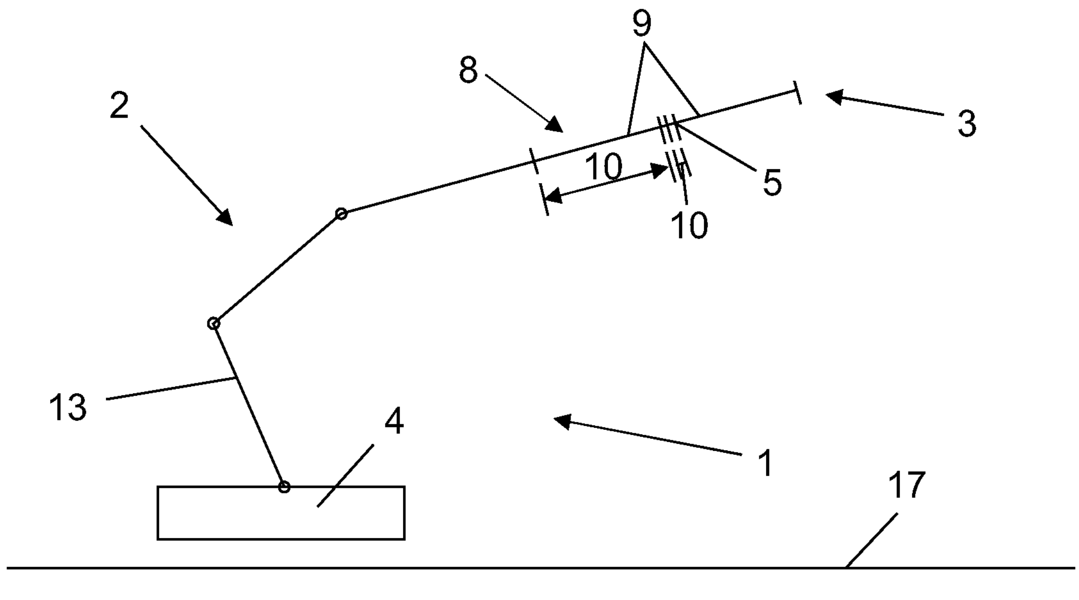

FIG. 3*b* shows the crane arm system 2 comprising an articulated system having a telescopic push arm system 8 and a plurality of telescopic push arms 9, wherein a current stroke length 10 of at least one of the push arms 9 is determined and taken into account when determining the position of the point 5 via a stroke length sensor system (not visible in the representation). The current stroke length 10 is taken into account in a model for determining the deformation 6 of the crane arm system 2. However, in contrast to FIG. 3*a*, the lifting gear 1 represented does not comprise a sequence control.

Figure 4A:
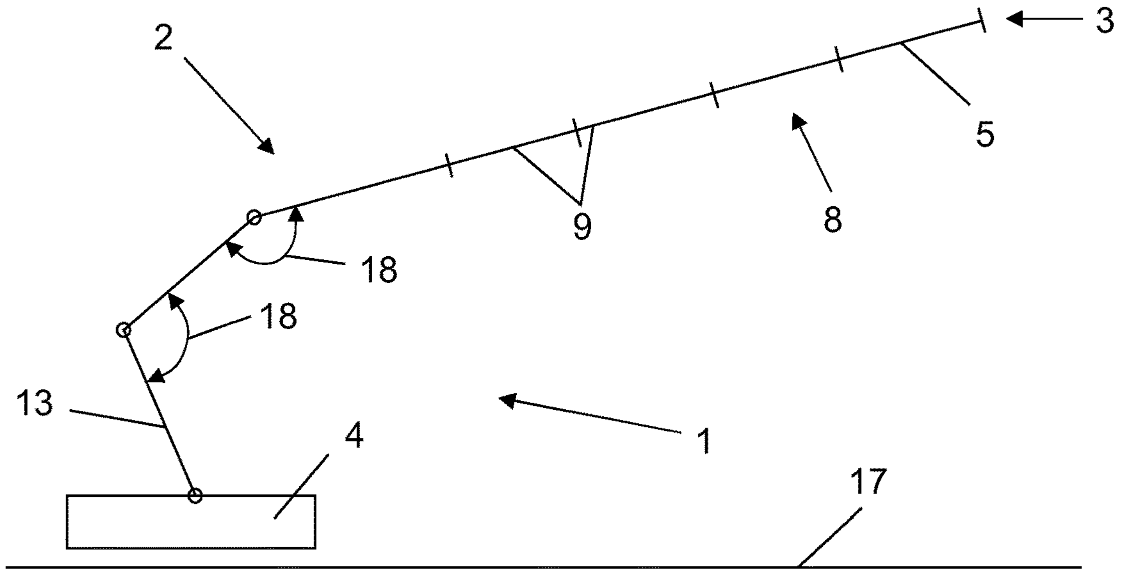
FIGS. 4*a*-4*c* shows a lifting gear in the case of an uninclined crane base and undeformed crane arm system, in the case of an inclined crane base and undeformed crane arm system and in the case of an inclined crane base and deformed crane arm system in a schematic representation.

FIG. 4*a* shows a state of a lifting gear 1 in a not inclined and undeformed position.

Figure 4B:
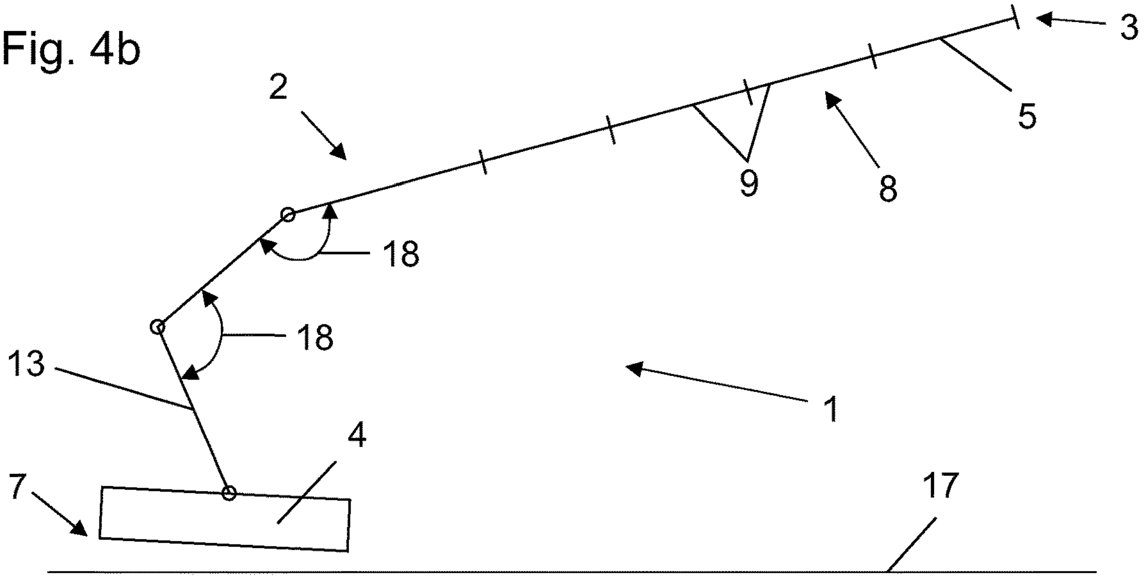

FIG. 4*b* shows a lifting gear 1 with a tilt because of an inclination 7 of the crane base 4, wherein the lifting gear 1 is undeformed.

Figure 4C:
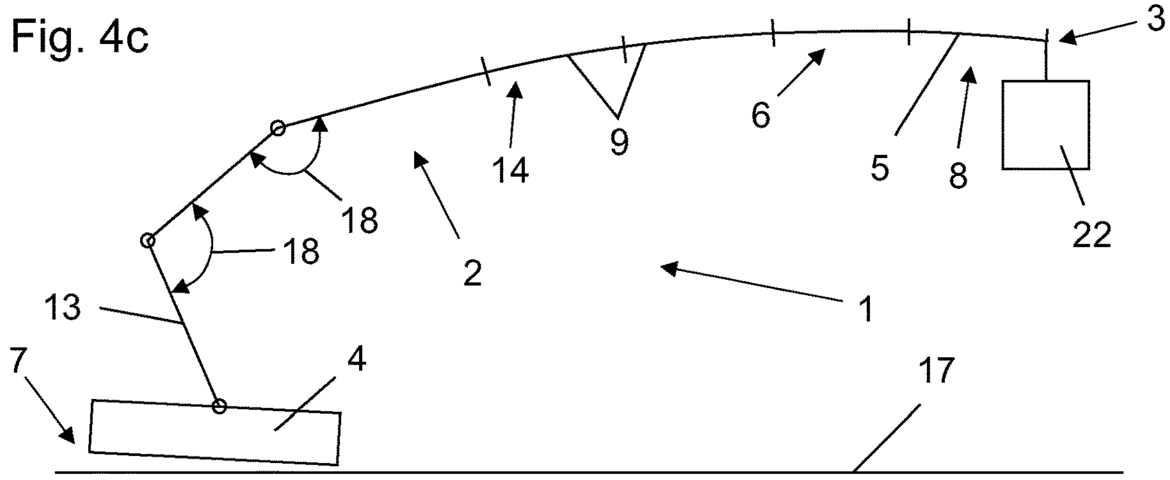

FIG. 4*c* shows an inclined and deformed lifting gear 1, wherein a model for determining the deformation 6 of the crane arm system 2 (and of the entire lifting gear 1) can be calibrated using a predefinable wear of the crane arm system 2 and a predefinable parameter, in order to increase an accuracy of the determination of the position of the point 5. A crane controller 25 can, for example in the case of a present wear, adapt the geometry of the crane arm system 2 corresponding to the input or impede operator input because of a lack of safety parameters.

The deformation 6 is generally dependent both on the load mass 22 and on the inclination 7 and the intrinsic moments in the case of present geometry of the lifting gear 1.

Control signals for the lifting gear 1 can be predefined manually and control variables for the actuators 23 (see FIG. 6) connected to the crane arm system 2 can be calculated taking into account the position of the point 5 and a predicted position of the point 5.

Through the determination of the position of the point 5, a trajectory planning of the position of the point 5 or of the lifting gear 1 per se can be created taking into account the inclination 7 of the crane base 4 and the deformation 6 of the crane arm system 2 along a planned trajectory in the sense of a path planning, wherein the trajectory planning can be created or newly calculated on the basis of the position of the point 5 stored in a database 24 (cf. crane controller 25 in FIG. 6).

Figure 5A:
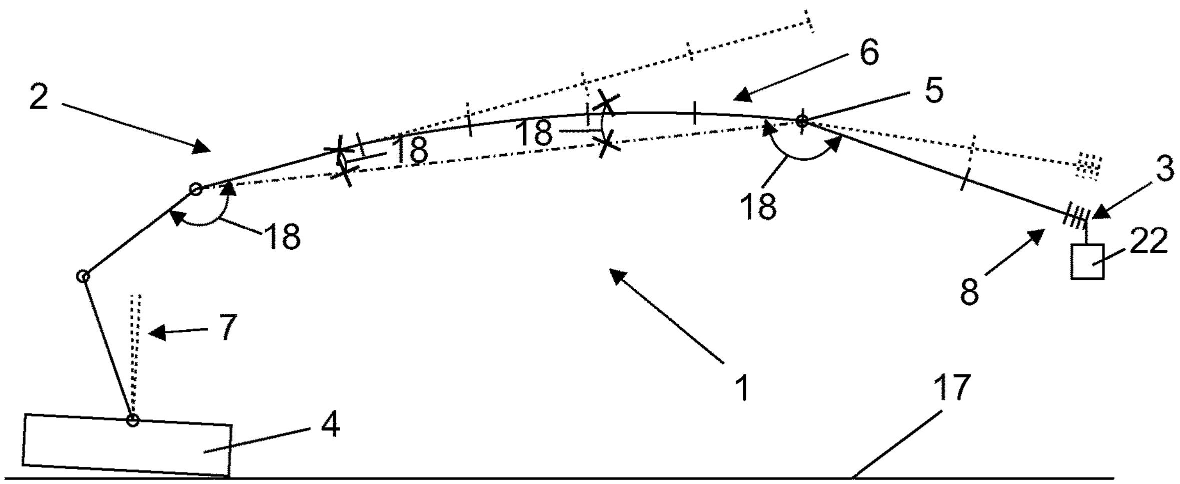
FIGS. 5*a*-5*b* shows a lifting gear having two articulated systems, wherein an angle between the two articulated systems was ascertained taking into account the deformation of the crane arm system and the inclination of the crane base as well as an inclined and undeformed lifting gear, in which angles were corrected to compensate for the inclination of the crane base, in a schematic representation.

FIG. 5*a* shows the lifting gear 1, wherein the inclination 7 of the crane base 4 relative to a flat ground 17 as reference and angle 18 between two articulated systems as well as angle 18 between a first push arm 9 (the push arm 9 next to the crane column 13) of a first articulated system and an articulated arm adjoining the first push arm 9 (in the direction of the crane column 13) are ascertained via an inclination sensor 15 and an angle sensor system 16 (cf. FIG. 6). Geometries of the articulated systems which do not allow for the deformation 6, in particular caused via the inclination 7, are indicated dashed.

The angles 18 relative to a dot-dashed line are calculated, wherein this allows for the deformation 6 via the individual push arms 9, in order to be able to correctly determine an inclination of the second articulated system in absolute coordinates in space, wherein this inclination would not be ascertainable merely via an angle determination (relative coordinates) between the two articulated systems (or possibly with correction angles).

Angles 18 between further rigid lifting gear sections 11 and/or rigid and/or deformable lifting gear sections 11, 14 can generally also be ascertained or calculated.

The inclination 7 of the crane base 4, the tilt of the lifting gear and the captured or calculated angles 18 are taken into account in the model for determining the deformation of the crane arm system 2, wherein the position of the point 5 is calculated.

In principle, the second articulated system is also subject to a deformation 6, but the second articulated system, as part of the crane arm system 2, was assumed to be rigid and thus undeformed in the deformation model. However, a deformation 6 of the second articulated system can generally also be included in the model for calculating the deformation 6 of the entire crane arm system 2. Several articulated systems and/or telescopic systems can generally be combined in the crane arm system 2 of the lifting gear 1, wherein the lifting gear 1 can also comprise several crane arm systems 2. Both articulated systems can be regarded as a common crane arm system 2. The position of the point 5 to be ascertained (here as a linking position of the second articulated system) is generally as desired and can also represent for example the crane tip 3 of the second articulated system. A plurality of points 5 is particularly preferred in order to be able to model the geometry of the lifting gear 1 with high accuracy.

Figure 5B:
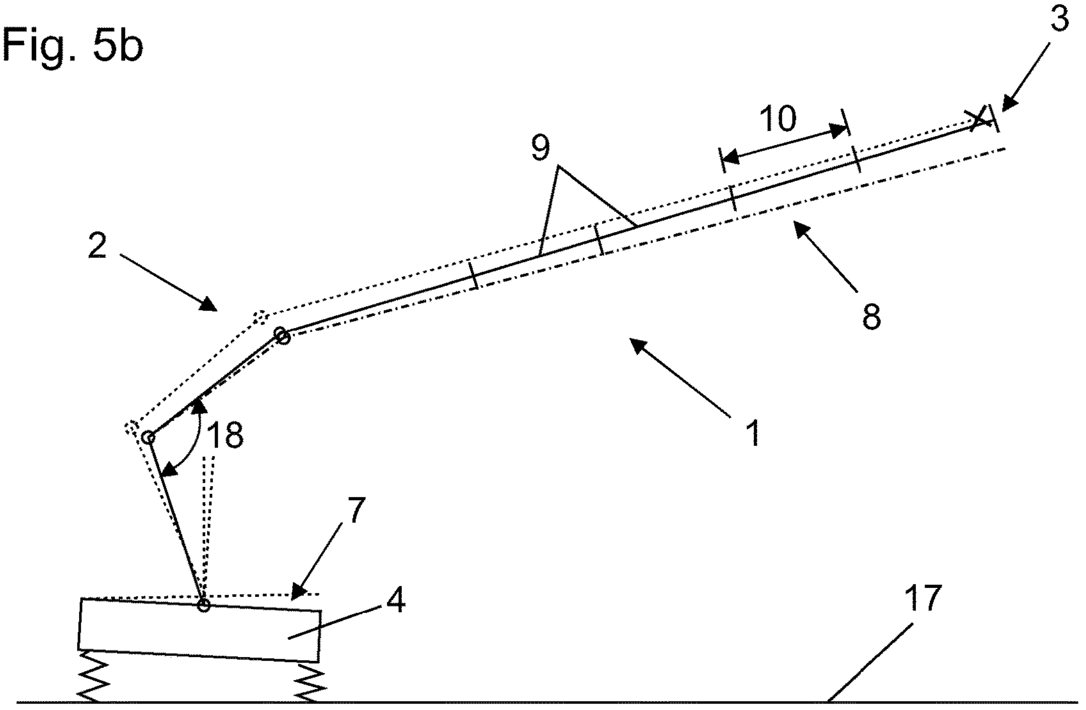

FIG. 5*b* shows an inclined lifting gear 1, wherein the crane geometry in the case of inclination 7 of the crane base 4 not existing is indicated dashed. The crane geometry in the case of inclination 7 of the crane base 4 being present is visible dot-dashed, wherein in the representation the angles 18 of the articulated system of the crane arm system 2 have been adapted such that the crane tip 3 approaches the uninclined state with the same stroke lengths 10 of the push arms 9. A total stroke length of the crane arm system can be calculated from the stroke lengths 10 of the individual push arms 9.

The different deformations 6 of the lifting gear 1 are generally also to be taken into account here, as an increased deformation 6 occurs in this inclined state of the crane base 4. The stroke lengths of the push arms 9 result in a further degree of freedom to be adapted, wherein varying stiffnesses also effect different deformations 6. The necessary correction angles for the articulated system can be calculated from the model for calculating the deformation of the crane arm system 2—preferably via vector addition—with the result that a lateral displacement and a height displacement (as well as an overhang) are also compensated for taking into account a possibly arranged load mass 22, wherein safety criteria can in particular be taken into account.

For example, the inclination 7 can be compensated for by the open-loop and/or closed-loop control device 28 as follows: a coordinate system is selected as reference, wherein this reference generally changes in the course of the inclination compensation and should accordingly be adapted during the calculation. Using linear algebra, a first correction angle of an arm of the crane arm system 2 can be deduced, wherein a second correction angle of the arm, which takes into account for example a changed position of the center of gravity, changed hydraulic oil distribution, changed intrinsic moments, changed load mass position et cetera in transformation matrices, can be deduced in the deformation model through a boundary condition that the position of a point 5 of the inclined geometry is to be identical to the position of the associated point 5 of the starting geometry of the crane arm system 2.

A position of the center of gravity of the crane arm system 2 in the determination of the position of the point 5 is taken into account depending on the inclination 7 of the crane base 4, the deformation of the crane arm system 2, a geometry of the crane arm system 2 and a weight of hydraulic oil arranged in the push arms 9 of the crane arm system 2. A load mass 22 arranged on the lifting gear 1 is calculated via the inclination 7 of the crane base 4, the deformation of the crane arm system 2, the geometry of the crane arm system 2 and the weight of hydraulic oil arranged in the push arms 9 of the crane arm system 2, wherein the weight of the hydraulic oil and the load mass 22 are integrated in the model for calculating the deformation of the crane arm system 2 and subsequently for determining the position of the point 5. A shift of the position of the center of gravity can bring about a change in a structural stability or an overload protection and is accordingly to be included in the calculation algorithm or the model for determining the deformation of the lifting gear 1.

FIG. 6 shows a vehicle-mounted lifting gear 1 which is arranged on a vehicle 12 having a supporting device. The position of the supporting device is generally as desired, wherein the inclination of the crane base 4 in relation to an inclination of the vehicle 12 can prove to be different for example in the case of an uneven ground or different firmnesses of the ground. The angle sensor system 16 is preferably located in a swivel joint of the lifting gear 1.

The lifting gear 1 is formed with a crane controller 25 in signal-carrying data connection with the crane arm system 2, wherein the crane controller 25 can also be part of the lifting gear 1 or be connected to the crane arm system 2 by wires. The lifting gear 1 comprises an open-loop and/or closed-loop control device 28, an articulated crane arm system 2 having a crane tip 3, a crane base 4, a sensor 29 arranged on the lifting gear 1 and an inclination sensor likewise arranged on the lifting gear 1.

The open-loop and/or closed-loop control device 28 for the lifting gear 1 can be supplied with sensor signals from the sensor 29 arranged on the lifting gear 1, wherein the open-loop and/or closed-loop control device 28 is configured in at least one operating mode to ascertain a deformation 6 of the crane arm system 2 arising under the action of dynamic and static forces taking into account the sensor signals and to determine a position of points 5 of the crane arm system 2 such as the crane tip 3 taking into account the deformation 6. The open-loop and/or closed-loop control device 28 is connected in a signal-carrying manner to the inclination sensor 15, wherein the open-loop and/or closed-loop control device 28 is configured in the at least one operating mode to determine a tilt of the lifting gear 1 because of an inclination 7 of the crane base 4 on which the lifting gear 1 is arranged relative to a predefined or predefinable direction in space taking into account inclination sensor signals from the inclination sensor 15 and to take it into account when determining the positions of the points 5.

The crane controller 25 comprises a data storage which is formed as a database 24 and an open-loop and/or closed-loop control device 28 as determination module of the crane controller 25 for carrying out the method, wherein an algorithm in the form of a computer program is stored on the data storage and when the computer program is executed by the open-loop and/or closed-loop control device 28 commands are executed which prompt the open-loop and/or closed-loop control device 28 to control the lifting gear 1 considering the positions of the points 5.

The position of the point 5 with the associated inclination 7 of the crane base 4 and further items of information such as for example the stroke lengths 10, connected to the position of the point 5, of push arms 9 and angles 18 between push arms 9 or between push arms 9 and the crane base 4 can be stored in the database 24.

The position of the point 5 can be made available to a semi-automatic function of the crane controller 25, wherein a trajectory planning of the lifting gear 1 can be ascertained taking into account the position of the point 5 and corrected by manual input from an operator of the lifting gear 1.

The lifting gear 1 comprises a capturing sensor system 26 in the form of a camera for capturing objects and obstacles within a reach of the lifting gear 1, wherein the objects and obstacles are taken into account in the trajectory planning via the open-loop and/or closed-loop control device 28 of the crane controller 25. Other capturing sensor systems 26 such as lidar, radar or the like are likewise possible.

A deformation 6 and inclination 7 of the vehicle 12 on which the lifting gear 1 is arranged with respect to a ground 17 can be ascertained or calculated via a vehicle sensor system, wherein these additional data can be taken into account when determining the position of the point 5.

If the crane arm system 2 has a partial sequence control or no sequence control, stroke lengths 10 of the push arms 9 can be ascertained via an additional sensor system and/or stiffnesses of push arms 9 that are not sequence-controlled can be combined into a common stiffness taking into account changes in the center of gravity in the calculation. It is also possible to carry out calculations of the deformation 6 of the crane arm system 2 via a deformation model with a first stiffness of the push arms 9 and with a second stiffness, different therefrom, of the push arms 9, wherein the calculation which generates the least favorable position of the point 5 is used in particular.

The invention claimed is:

1. A method for open-loop and/or closed-loop control of a vehicle-mounted lifting gear, comprising an articulated crane arm system having a crane tip and a crane base, taking into account an ascertained position of at least one point of the crane arm system, in particular the crane tip, wherein a deformation of the crane arm system arising under the action of dynamic and/or static forces is taken into account when determining the position of the at least one point, wherein a tilt of the lifting gear because of an inclination of the crane base relative to a predefined or predefinable direction in space is determined and taken into account when determining the position of the at least one point.

2. The method according to claim 1, wherein the crane arm system comprises at least one telescopic push arm system having at least two push arms, wherein a current stroke length of at least one of the at least two push arms is determined and taken into account when determining the position of the at least one point, preferably via a stroke length sensor system, wherein the current stroke length is taken into account in a model for determining the deformation of the crane arm system.

3. The method according to claim 2, wherein the at least two push arms have different stiffnesses from each other, wherein the stiffnesses are calculated and/or taken into account for determining the position of the at least one point.

4. The method according to claim 3, wherein the stiffnesses, an influence of the stiffnesses on the deformation of the crane arm system and/or the deformation of the crane arm system are ascertained via the inclination of the crane base and/or the tilt of the lifting gear and/or the stroke length of the at least two push arms.

5. The method according to claim 1, wherein the crane arm system comprises at least two telescopic push arms, wherein the at least two push arms have a sequence control, wherein a currently present stroke length of the at least one push arm is taken into account when determining the position of the at least one point.

6. The method according to claim 1, wherein the crane arm system comprises at least two telescopic push arms and comprises a partial sequence control or is formed without sequence control, wherein

- an additional sensor system is provided for ascertaining stroke lengths of the at least two push arms and/or
- stiffnesses of push arms that are not sequence-controlled are combined into a common stiffness, wherein a shift of the center of gravity of the lifting gear is preferably taken into account, and/or
- a calculation of the deformation of the crane arm system is carried out via a model for determining the deformation of the crane arm system with a first stiffness of the at least two push arms and with a second stiffness, different compared with the first stiffness, of the at least two push arms.

7. The method according to claim 1, wherein the lifting gear comprises at least one rigid lifting gear section, preferably the crane base, a vehicle for the lifting gear and/or a crane column, and at least one deformable lifting gear section, preferably at least one possibly existing push arm of the crane arm system, wherein the inclination of the lifting gear on the at least one rigid lifting gear section is determined and/or is taken into account in a model for determining the deformation of the crane arm system.

8. The method according to claim 7, wherein, preferably via at least one inclination sensor and/or at least one angle sensor system,

- the inclination of the crane base relative to a ground and/or
- at least one angle between a rigid lifting gear section and at least one further rigid lifting gear section and/or
- at least one angle between a rigid lifting gear section and a deformable lifting gear section and/or
- at least one angle between a deformable lifting gear section and a further deformable lifting gear section is ascertained, wherein the inclination of the crane base, the tilt of the lifting gear and/or the at least one angle is taken into account in a model for determining the deformation of the crane arm system, wherein the position of the at least one point is calculated.

9. The method according to claim 1, wherein a plurality of points of the crane arm system is calculated, wherein a geometry of the crane arm system, preferably of the lifting gear, is ascertained via the plurality of the points.

10. The method according to claim 1, wherein a load mass arranged on the lifting gear is calculated taking into account the deformation of the crane arm system and the inclination of the crane base, wherein it is preferably provided that the load mass is calculated before, during and/or after the determination of the position of the at least one point, particularly preferably via a possibly existing angle sensor system and/or a pressure sensor system.

11. The method according to claim 1, wherein a load mass is taken into account in a model for determining the deformation of the crane arm system.

12. The method according to claim 1, wherein a model for determining the deformation of the crane arm system is calibrated using a predefinable or predefined wear of the crane arm system and/or at least one predefinable or predefined parameter.

13. The method according to claim 1, wherein at least one control signal is manually predefined for the lifting gear and at least one control variable is calculated for at least one actuator taking into account the position of the at least one point and/or a predicted position of at least one point.

14. The method according to claim 1, wherein a deformation and/or inclination of a vehicle on which the lifting gear is arranged with respect to a ground is ascertained and/or calculated and is taken into account when determining the position of the at least one point.

15. The method according to claim 1, wherein the position of the at least one point with the associated inclination of the crane base and/or the associated deformation of the crane arm system, preferably with possibly existing stroke lengths of push arms and/or angles between push arms and the crane base, are stored in a database.

16. The method according to claim 1, wherein a trajectory planning of the position of the at least one point and/or of the lifting gear taking into account the inclination of the crane base and the deformation of the crane arm system is created along a planned trajectory through the determination of the position of the at least one point.

17. The method according to claim 15, wherein the trajectory planning is created on the basis of the positions of the at least one point stored in the database.

18. The method according to claim 1, wherein the position of the at least one point is made available to at least one semi-automatic function of a crane controller, wherein it is preferably provided that a trajectory planning of the lifting gear is ascertained taking into account the position of the at least one point and/or can be corrected by manual input.

19. The method according to claim 16, further comprising at least one capturing sensor system, preferably a camera, for capturing objects and/or obstacles within a reach of the lifting gear, wherein the objects and/or obstacles are taken into account in the trajectory planning.

20. The method according to claim 1, wherein a position of the center of gravity of the crane arm system is taken into account in the determination of the position of the at least one point depending on the inclination of the crane base, the deformation of the crane arm system, a geometry of the crane arm system and/or a weight of hydraulic oil arranged in at least one push arm of the crane arm system, wherein a load mass possibly arranged on the lifting gear is preferably calculated via the inclination of the crane base, the deformation of the crane arm system, the geometry of the crane arm system and/or the weight of hydraulic oil arranged in the at least one push arm of the crane arm system.

21. The method according to claim 20, wherein a shift of the position of the center of gravity brings about a change in a structural stability and/or an overload protection.

22. An open-loop and/or closed-loop control device for a vehicle-mounted lifting gear configured to perform the method according to claim 1, the open-loop and/or closed-loop control device comprising an articulated crane arm system having a crane tip, wherein the open-loop and/or closed-loop control device can be supplied with at least one sensor signal from at least one sensor arranged on the lifting gear, wherein the open-loop and/or closed-loop control device is configured in at least one operating mode to ascertain a deformation of the crane arm system arising under the action of dynamic and/or static forces taking into account the at least one sensor signal and to determine a position of at least one point of the crane arm system, in particular the crane tip, taking into account the deformation, wherein the open-loop and/or closed-loop control device is or can be connected to an inclination sensor in a signal-carrying manner, wherein the open-loop and/or closed-loop control device is configured in the at least one operating mode to determine a tilt of the lifting gear because of an inclination of the crane base on which the lifting gear is arranged relative to a predefined or predefinable direction in space taking into account inclination sensor signals from the inclination sensor and to take it into account when determining the position of the at least one point.

23. An open-loop and/or closed-loop control device configured to carry out a method according to claim 1.

24. A vehicle-mounted lifting gear having at least one open-loop and/or closed-loop control device according to claim 22, an articulated crane arm system having a crane tip, a crane base, at least one sensor arranged on the lifting gear and an inclination sensor.

25. A computer program product comprising commands which, when executed by an open-loop and/or closed-loop control device, prompt the open-loop and/or closed-loop control device to carry out the steps of at least one method according to claim 1.

* * * * *